US012056980B2

(12) United States Patent
Tam et al.

(10) Patent No.: US 12,056,980 B2
(45) Date of Patent: Aug. 6, 2024

(54) GAMING MACHINE HAVING MODIFIABLE SYMBOLS AND PRIZE AWARDING SYMBOLS

(71) Applicant: Aristocrat Technologies Australia Pty Limited, North Ryde (AU)

(72) Inventors: Billy Tam, Lindfield (AU); Liam Sanders, Neutral Bay (AU); Alessandro Sidoti, Cromer (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 102 days.

(21) Appl. No.: 17/833,771

(22) Filed: Jun. 6, 2022

(65) Prior Publication Data

US 2022/0301389 A1 Sep. 22, 2022

Related U.S. Application Data

(63) Continuation of application No. 16/983,590, filed on Aug. 3, 2020, now Pat. No. 11,354,971, which is a continuation of application No. 16/143,095, filed on Sep. 26, 2018, now Pat. No. 10,748,371.

(30) Foreign Application Priority Data

Sep. 28, 2017 (AU) ................................ 2017903931

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
None
See application file for complete search history.

(56) References Cited

U.S. PATENT DOCUMENTS 8,177,620 B2 5/2012 Miles
8,257,160 B2 9/2012 Jaffe
8,574,064 B2 11/2013 Gilmore
8,651,945 B2 2/2014 Souza
8,678,908 B2 3/2014 Nicely
9,430,900 B2 8/2016 Zoltewicz
10,332,335 B2 6/2019 Halvorson
10,872,502 B2 12/2020 Kendall
(Continued)

OTHER PUBLICATIONS

Australian Examination Report No. 1 issued in App. No. AU2018236750, dated Nov. 21, 2022, 6 pages.
(Continued)

*Primary Examiner* — Ronald Laneau
(74) *Attorney, Agent, or Firm* — McAndrews, Held & Malloy, Ltd.

(57) ABSTRACT

An gaming system includes a display device, an input device, and a game controller. When the game controller determines that a condition is met, the game controller modifies a plurality of symbols selected for display to include a prize awarding symbol. When the game controller determines that a designated condition is met, the game controller modifies the prize awarding symbol to reveal an award. The game controller evaluates the plurality of symbols to determine an award amount.

20 Claims, 8 Drawing Sheets

(56) References Cited

U.S. PATENT DOCUMENTS

| | | | | |
|---|---|---|---|---|
| 2010/0210343 | A1* | 8/2010 | Englman | G07F 17/32 463/43 |
| 2012/0322533 | A1* | 12/2012 | Gomez | G07F 17/3267 463/20 |
| 2013/0084965 | A1* | 4/2013 | Gura | G07F 17/3274 463/31 |
| 2015/0011290 | A1 | 1/2015 | Galansky | |
| 2019/0096167 | A1 | 3/2019 | Tam | |
| 2019/0102990 | A1* | 4/2019 | Chan | G07F 17/3225 |
| 2020/0364973 | A1* | 11/2020 | Tam | G07F 17/34 |
| 2022/0301389 | A1* | 9/2022 | Tam | G07F 17/3213 |

OTHER PUBLICATIONS

Notice of Allowance dated Apr. 13, 2020 for U.S. Appl. No. 16/143,095 (pp. 1-8).
Corrected Notice of Allowance dated Jun. 4, 2020 for U.S. Appl. No. 16/143,095 (pp. 1-5).
Office Action (Non-Final Rejection) dated Aug. 24, 2021 for U.S. Appl. No. 16/983,590 (pp. 1-6).
Office Action (Notice of Allowance and Fees Due (PTOL-85)) dated Feb. 4, 2022 for U.S. Appl. No. 16/983,590 (pp. 1-5).
Office Action (Notice of Allowance and Fees Due (PTOL-85)) dated Feb. 24, 2022 for U.S. Appl. No. 16/983,590 (pp. 1-2).

* cited by examiner

GAMING MACHINE HAVING MODIFIABLE SYMBOLS AND PRIZE AWARDING SYMBOLS

RELATED APPLICATIONS

The present application is a continuation of and claims priority to U.S. patent application Ser. No. 16/983,590, filed on Aug. 3, 2020, issued on Jun. 7, 2022, as U.S. Pat. No. 11,354,971, entitled "A Gaming Machine Having Modifiable Symbols And Prize Awarding Symbols," which is a continuation of and claims priority to U.S. patent application Ser. No. 16/143,095, filed on Sep. 26, 2018, issued on Aug. 18, 2020, as U.S. Pat. No. 10,748,371 entitled "A Gaming Machine Having Modifiable Symbols And Prize Awarding Symbols," which claims priority to Australian Patent Application No. AU 2017903931, filed Sep. 28, 2017, and entitled "An Electronic Method of Gaming, an Electronic Gaming System and a Game Controller," which are hereby incorporated by reference in their entireties.

BACKGROUND

The present disclosure relates to an electronic method of gaming, an electronic gaming system and a game controller.

In spinning reel games on electronic gaming systems such as "slot" gaming machines, symbols are selected for display on a display of the machine on respective symbol display positions before the displayed symbols are then evaluated by a game controller of the machine to determine whether there is any winning combination or combinations in the display symbols. If the game controller determines that there is a winning combination or combinations, a prize is awarded for each winning combination.

A need exists for alternative gaming systems.

SUMMARY

In a first aspect, the disclosure provides an electronic gaming system comprising: a display; an input device; and a game controller comprising a memory storing a symbol set including at least one prize awarding symbol, the game controller arranged to implement: a symbol selector arranged to select from the symbol set a plurality of symbols for display on the display; a prize awarding symbol determiner arranged to determine whether or not there is at least one prize awarding symbol in the plurality of symbols selected by the symbol selector; an input device monitor arranged to monitor the input device to determine whether or not a designated condition is met; a prize awarding symbol modifier arranged to, upon the input device monitor determining that the designated condition is met and the prize awarding symbol determiner determining that there is at least one prize awarding symbol in the plurality of symbols, modify the at least one prize awarding symbol to reveal at least one award; and a prize awarder arranged to evaluate the plurality of symbols as modified, in order to award at least one prize.

In an embodiment, the input device is a game play mechanism, and the input device monitor determines that the designated condition is met when game play is initiated by the game play mechanism.

In an embodiment, each prize awarding symbol is a coin.

In an embodiment, the prize awarding symbol modifier modifies each coin by flipping the coin.

In an embodiment, the gaming system further comprises an award determiner arranged to determine whether at least one award is a bonus prize, a mini jackpot, a minor jackpot, a major jackpot or a grand jackpot.

In an embodiment, the input device monitor is arranged to, upon the award determiner determining that at least one award is a bonus prize, a mini jackpot, a minor jackpot, a major jackpot or a grand jackpot, monitor the input device to determine whether or not another designated condition is met.

In an embodiment, the input device monitor determines that another designated condition is met when another game play is initiated.

In an embodiment, the prize awarding symbol modifier modifies each award into another award, upon the input device monitor determining that another designated condition is met.

In an embodiment, the gaming system further comprises upon the award determiner determining that at least one modified award is a bonus prize, a mini jackpot, a minor jackpot, a major jackpot or a grand jackpot and the input device monitor determining that another designated condition is met: the prize awarding symbol modifier repeatedly modifying each modified award into another modified award, until the award determiner determines that no modified award is a bonus prize, a mini jackpot, a minor jackpot, a major jackpot or a grand jackpot.

In an embodiment, the prize awarding symbol modifier modifies each award by flipping the award.

In an embodiment, upon the award determiner determining that no modified award is a bonus prize, a mini jackpot, a minor jackpot, a major jackpot or a grand jackpot, the prize awarder evaluates the plurality of symbols as repeatedly modified in order to award at least one other prize.

In an embodiment, the game controller is arranged to implement a display controller arranged to control the display to display each symbol on a respective one of a plurality of symbol display positions on the display.

In an embodiment, the input device monitor monitors the input device, upon the display controller controlling the display to display each symbol on a respective one of a plurality of symbol display positions on the display.

In an embodiment, the prize awarding symbol modifier modifies the at least prize awarding symbol to reveal the at least one award, by replacing each prize awarding symbol displayed on the display with a wild symbol.

In an embodiment, the prize awarding symbol modifier modifies the at least prize awarding symbol to reveal the at least one award, by replacing a plurality of symbols displayed on the display with wild symbols.

In a second aspect, the disclosure provides an electronic method of gaming on a gaming system comprising a display, an input device and a game controller comprising a memory storing a symbol set including at least one prize awarding symbol, the method comprising: selecting, by a symbol selector implemented by the game controller, a plurality of symbols from the symbol set for display on the display; determining, by a prize awarding symbol determiner implemented by the game controller, whether or not there is at least one prize awarding symbol in the plurality of symbols selected by the symbol selector; monitoring, by an input device monitor implemented by the game controller, the input device to determine whether or not a designated condition is met; and upon the input device monitor determining that the designated condition is met and the prize awarding symbol determiner determining that there is at least one prize awarding symbol in the plurality of symbols, modifying, by a prize awarding symbol modifier implemented by the game controller, the at least one prize awarding symbol to reveal at least one modified award; and evaluating, by a prize awarder implemented by the game controller, the plurality of symbols as modified, in order to award at least one prize.

In an embodiment, the input device is a game play mechanism, and the input device monitor determines that the designated condition is met when game play is initiated by the game play mechanism.

In an embodiment, each prize awarding symbol is a coin.

In an embodiment, the prize awarding symbol modifier modifies each coin by flipping the coin.

In an embodiment, the method further comprises determining, by an award determiner implemented by the game controller, whether at least one award is a bonus prize, a mini jackpot, a minor jackpot, a major jackpot or a grand jackpot.

In an embodiment, the method further comprises monitoring, by the input device monitor, the input device to determine whether or not another designated condition is met, upon the award determiner determining that at least one award is a bonus prize, a mini jackpot, a minor jackpot, a major jackpot or a grand jackpot.

In an embodiment, the input device monitor determines that another designated condition is met when another game play is initiated.

In an embodiment, the method further comprises monitoring, by the prize awarding symbol modifier, each award into another award, upon the input device monitor determining that another designated condition is met.

In an embodiment, the method further comprises upon the award determiner determining that at least one modified award is a bonus prize, a mini jackpot, a minor jackpot, a major jackpot or a grand jackpot and the input device monitor determining that another designated condition is met: repeatedly modifying, by the prize awarding symbol modifier, each modified award to reveal another modified award, until the award determiner determines that no modified award is a bonus prize, a mini jackpot, a minor jackpot, a major jackpot or a grand jackpot.

In an embodiment, the prize awarding symbol modifier modifies each award by flipping the award.

In an embodiment, the method further comprises upon the award determiner determining that no modified award is a bonus prize, a mini jackpot, a minor jackpot, a major jackpot or a grand jackpot, evaluating, by the prize awarder, the plurality of symbols as repeatedly modified in order to award at least one other prize.

In an embodiment, the method further comprises controlling, by a display controller implemented by the game controller, the display to display each symbol on a respective one of a plurality of symbol display positions on the display.

In an embodiment, the input device monitor monitors the input device, upon the display controller controlling the display to display each symbol on a respective one of a plurality of symbol display positions on the display.

In an embodiment, the prize awarding symbol modifier modifies the at least prize awarding symbol to reveal the at least one award, by replacing each prize awarding symbol displayed on the display with a wild symbol.

In an embodiment, the prize awarding symbol modifier modifies the at least prize awarding symbol to reveal the at least one award, by replacing a plurality of symbols displayed on the display with wild symbols.

In a third aspect, the disclosure provides a gaming machine arranged to: select a plurality of symbols from the symbol set for display on a display; determine whether or not there is at least one prize awarding symbol in the plurality of symbols selected by the symbol selector; monitor an input device to determine whether or not a designated condition is met; and upon determining that the designated condition is met and that there is at least one prize awarding symbol in the plurality of symbols, modify the at least one prize awarding symbol to reveal at least one modified award; and evaluate the plurality of symbols as modified, in order to award at least one prize.

The disclosure also provides computer program code which when executed by components of a game controller of a gaming system implements any one of the above methods.

For example, the disclosure provides computer program code which when executed by a processor of a game controller causes the processor to: select a plurality of symbols from the symbol set for display on a display; determine whether or not there is at least one prize awarding symbol in the plurality of symbols selected by the symbol selector; monitor an input device to determine whether or not a designated condition is met; and upon determining that the designated condition is met and that there is at least one prize awarding symbol in the plurality of symbols, modify the at least one prize awarding symbol to reveal at least one modified award; and evaluate the plurality of symbols as modified, in order to award at least one prize.

The disclosure also provides a tangible computer readable medium comprising the above computer program code.

BRIEF DESCRIPTION OF DRAWINGS

An exemplary embodiment of the disclosure will now be described with reference to the accompanying drawings in which.

DETAILED DESCRIPTION

Figure 1:
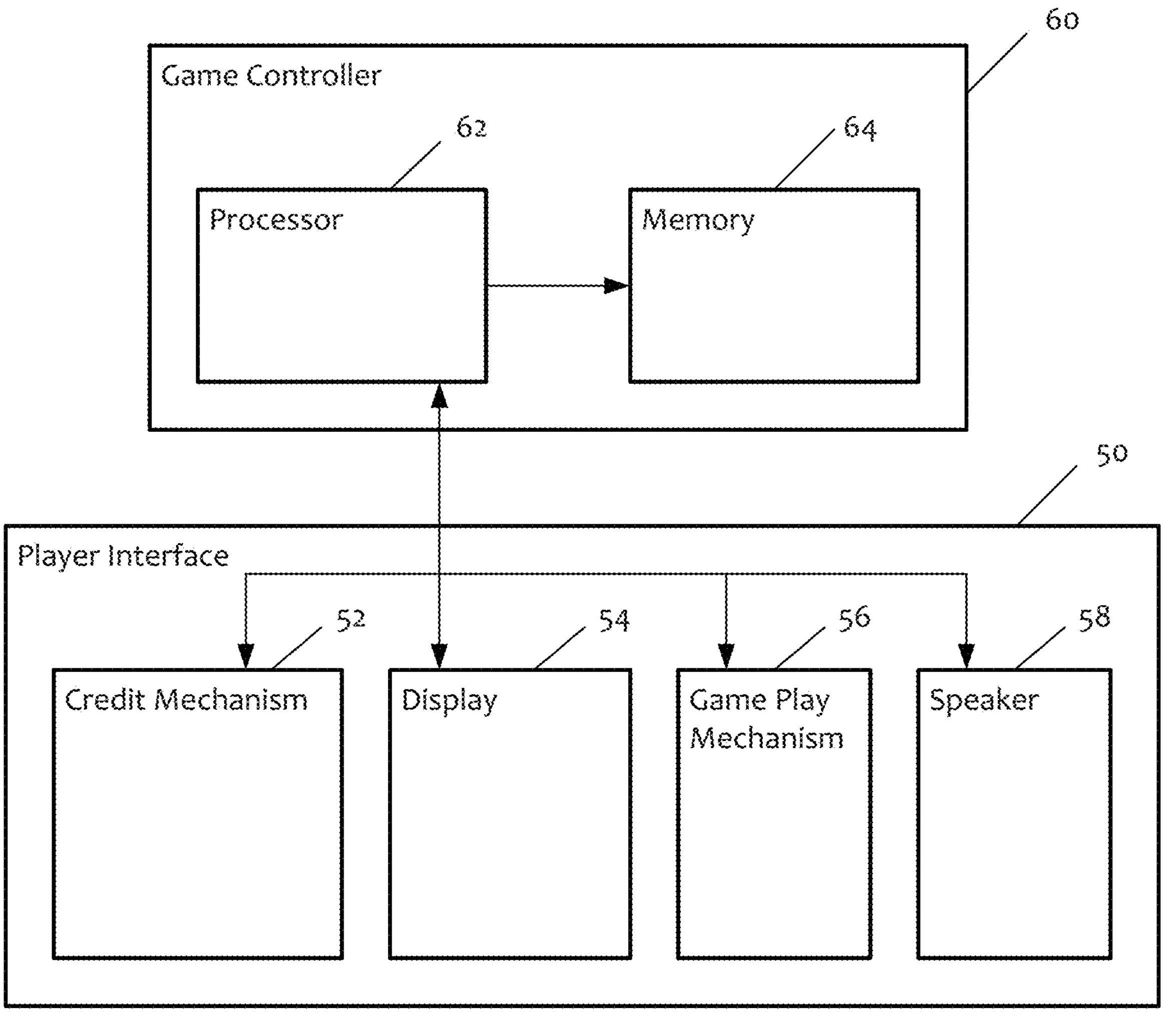
FIG. 1 is a block diagram of the core components of a gaming system.

Referring to the drawings, there is shown an embodiment of an electronic gaming system arranged to select symbols for display on a display of the gaming system, determine whether or not there is at least one prize awarding symbol in the symbols, and monitor an input device of the gaming system to determine whether a designated condition is met. If the gaming system determines that there is at least one prize awarding symbol in the symbols and that the designated condition is met, the at least one prize awarding symbol is modified by the gaming system to reveal at least one award. The symbols as modified by the gaming system are then evaluated by the gaming system to award at least one prize.

In an embodiment of the gaming system, the gaming system displays a prize awarding animation upon determining that there is at least one prize awarding symbol in the symbols. Accordingly, upon display of the prize awarding animation, a player of the gaming system can control the input device such that the designated condition is met in order to cause the gaming system to modify the at least one prize awarding symbol in the symbols to reveal the at least one award.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
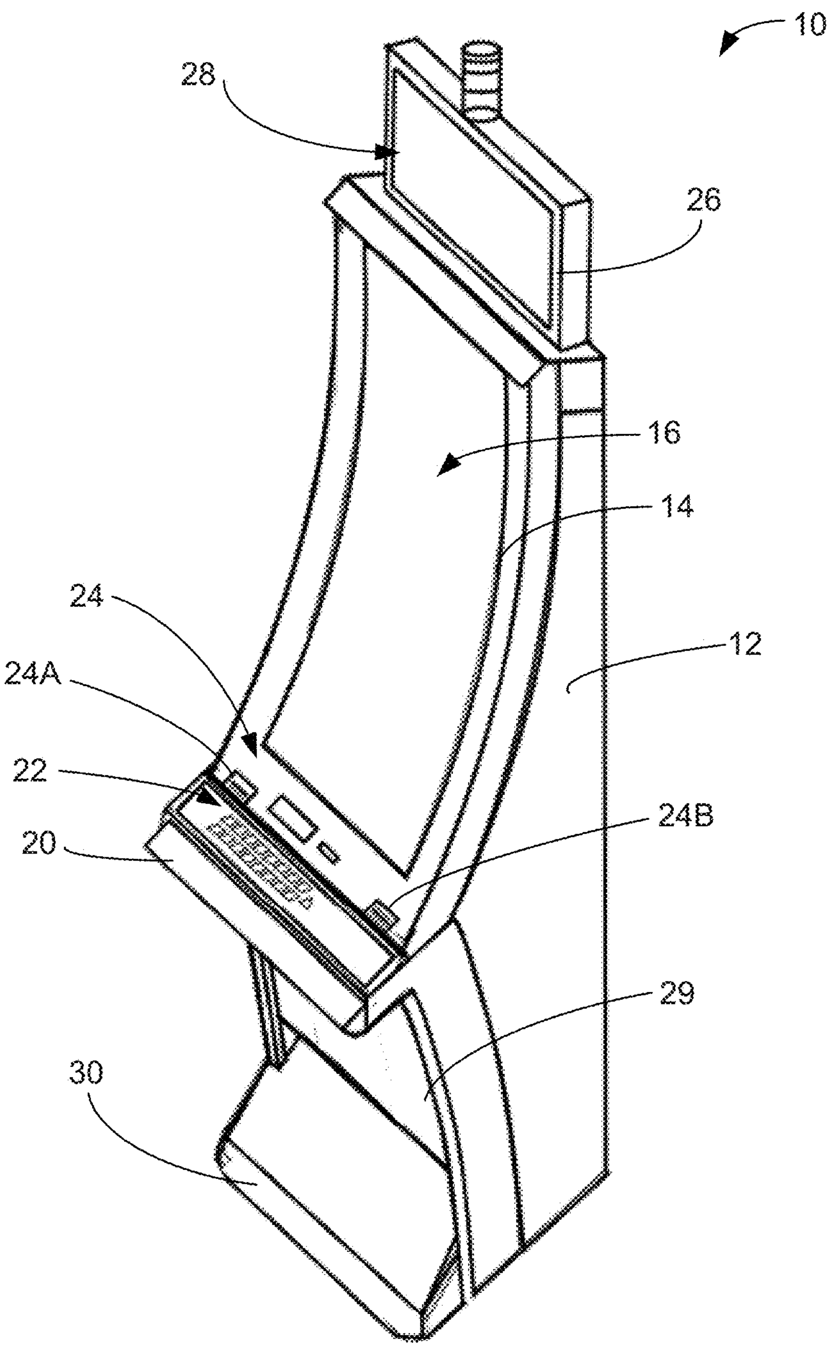
FIG. 2 is a perspective view of a standalone gaming machine.

A gaming system in the form of a standalone gaming machine 10 is illustrated in FIG. 2. The gaming machine 10 includes a console 12 having a video display 14. A mid-trim 20 of the gaming machine 10 houses a bank of buttons 22 for enabling a player to interact with the gaming machine, in particular during game play. The video display 14 may also have a touch screen to enable the user to input instructions. The video display 14 shown in FIG. 2 is in the form of a video display unit, particularly a liquid crystal display. Alternatively, the display 14 may be OLED display, any other suitable video display unit. A top box 26 carrying artwork 28 may have a secondary video display which may be of the same type as the display 14, or of a different type.

The mid-trim 20 also houses a credit input mechanism 24 such as a coin input chute 24A and a bill collector 24B. While not shown in FIG. 2, the credit input mechanism 24 may also be in the form of the player marketing module 50 of FIG. 1 having a reading device for the purpose of reading a player tracking device, for example as part of a loyalty program. The player tracking device may be in the form of a card, flash drive or any other portable storage medium capable of being read by the reading device. The player marketing module 50 of FIG. 1 also allows the player to transferring credits to the gaming machine from credits stored on the player tracking device or by transferring credits from a player account in data communication with the player marketing module. Other embodiments of gaming machines may have a ticket reader for reading tickets having a value and crediting the player based on the face value of the ticker.

Artwork and/or information may be provided on a front panel 29 of the console 12. A coin tray 30 is mounted beneath the front panel 29 for dispensing cash payouts from the gaming machine 10.

Figure 3:
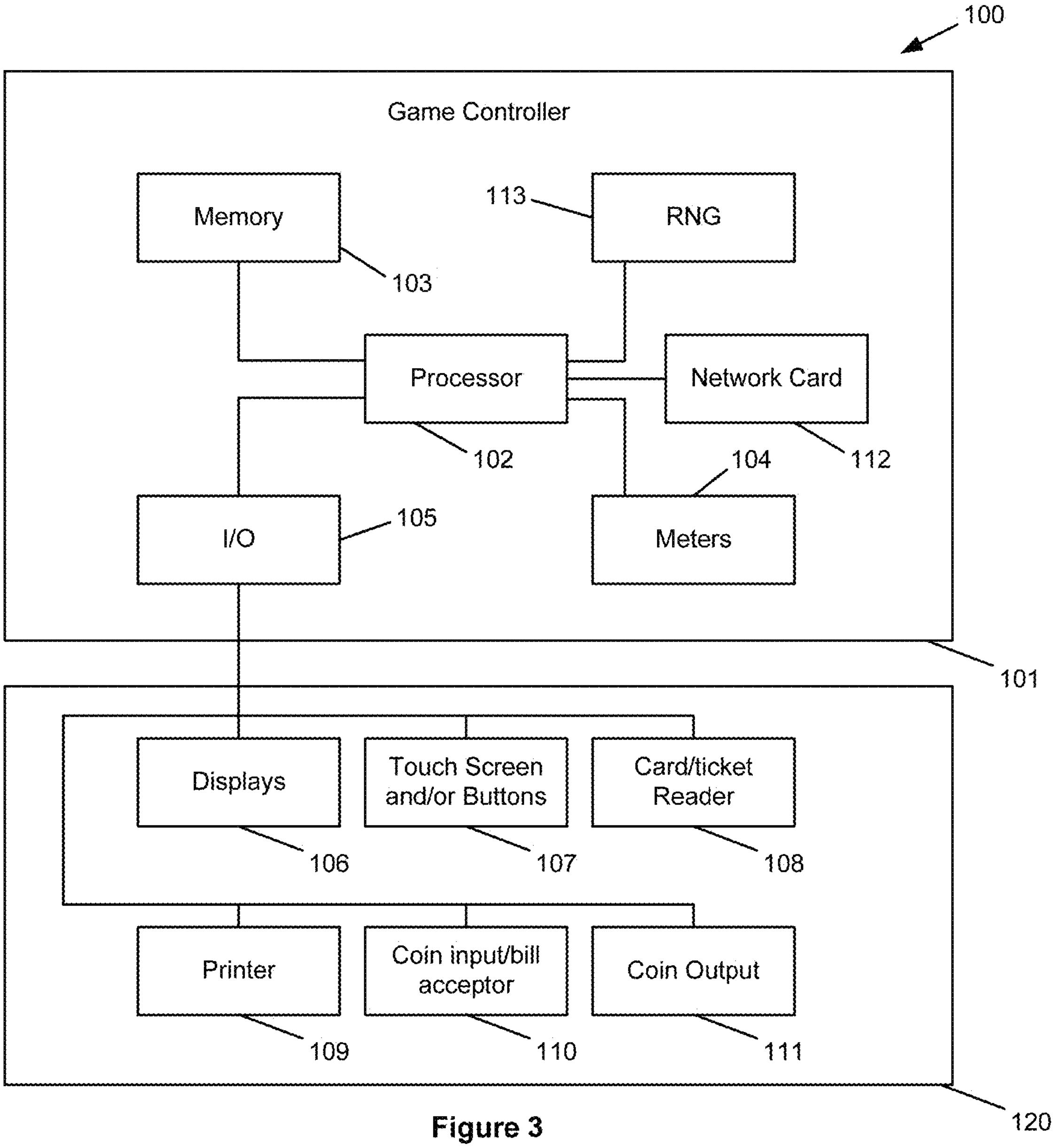
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
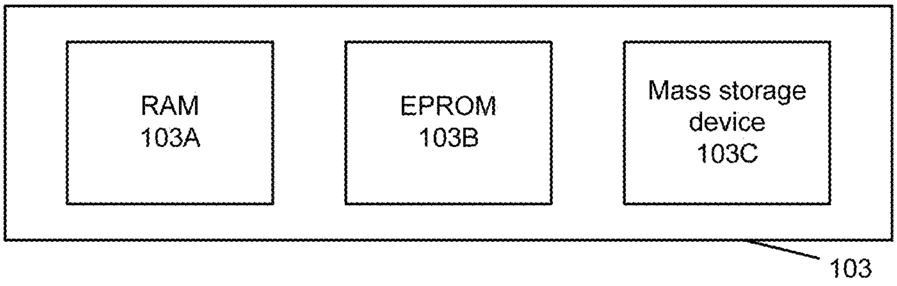
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices such as one or more displays 106, touch screen and/or buttons 107, card and/or ticket reader 108, printer 109, bill acceptor and/or coin input mechanism 110, coin output mechanism 111 to be provided remotely from the game controller 101.

Figure 5:
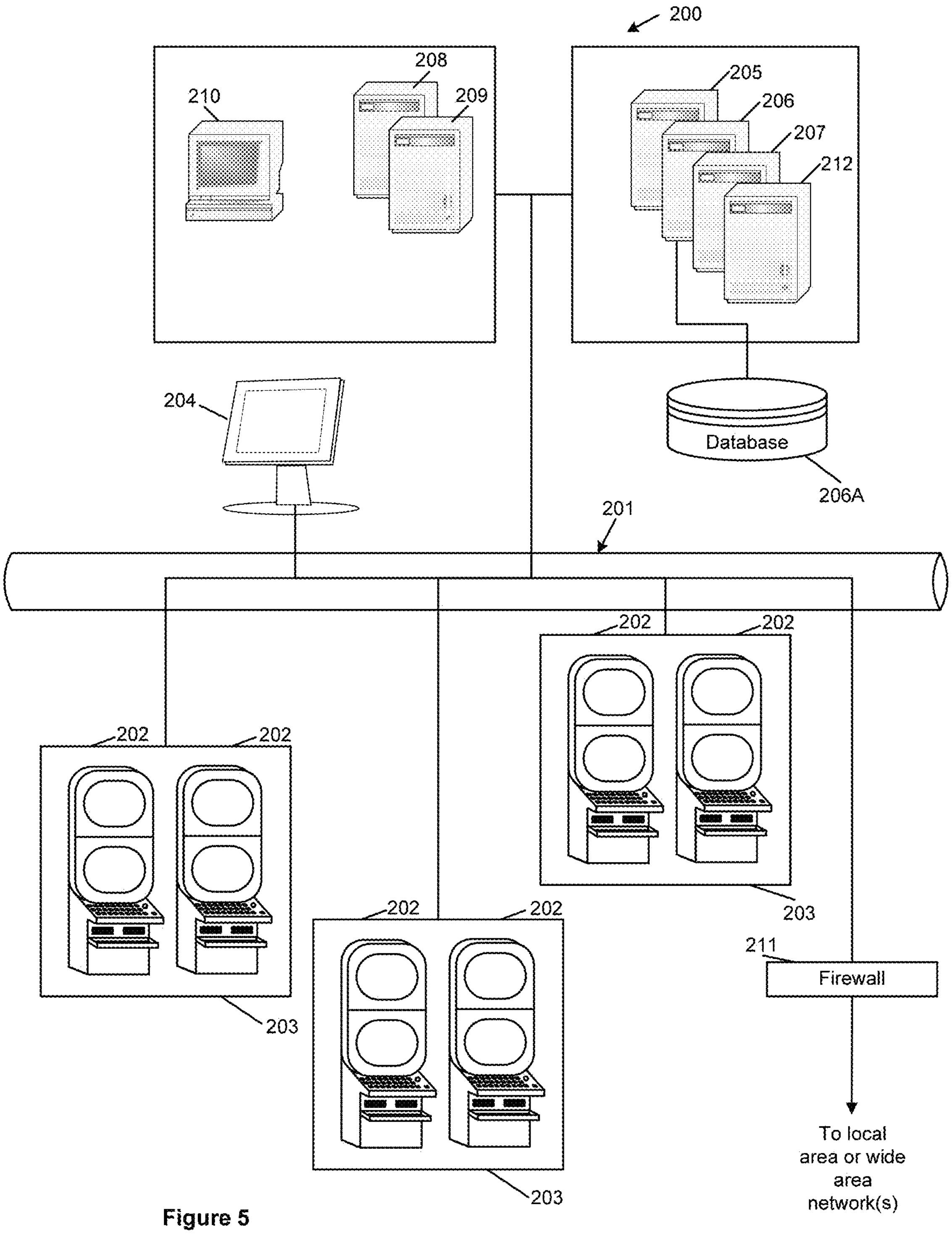
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming machines 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming system 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

In order to play a game, the player operates the game play mechanism 56 to specify a wager and hence any win entitlement which will be evaluated for the play of the game, and initiates the play of the game. Persons skilled in the art will appreciate that a player's win entitlement will vary from game to game dependent on player selections. In most spinning reel games, it is typical for the player's entitlement to be affected by the amount they wager and selections they make (that is, the nature of the wager). For example, a player's win entitlement may be based on how many lines they play in each game—for example, a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of paylines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the center row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
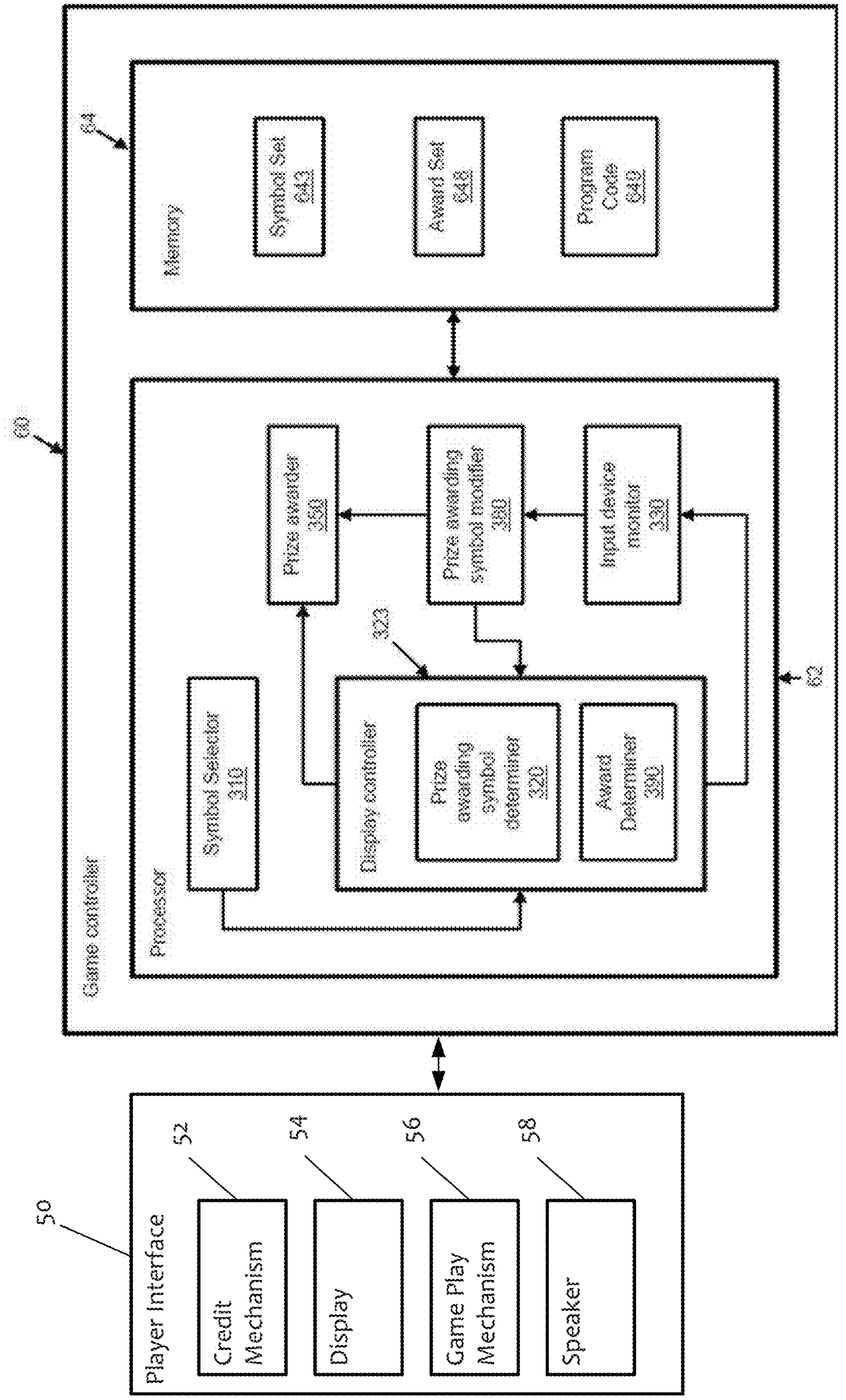
FIG. 6 is a further block diagram of a gaming system.

In FIG. 6, the processor 62 of the game controller 60 of an embodiment of the electronic gaming system 1 is shown implementing a number of modules based on game program code 649 stored in the memory 64. Persons skilled in the art will appreciate that one or more of the modules could be implemented in some other way, for example by a dedicated circuit.

These modules include a symbol selector 310 which selects, in response to a player's operation of the game play mechanism 56 to place a wager and initiate game play, a plurality of symbols from the memory 64. The symbols are selected from a symbol set 643 stored in the memory 64, and may include one or more prize awarding symbols. In this embodiment, any prize awarding symbol or symbols are selected by the symbol selector 310 together with the other symbols (that is, symbols other than the prize awarding symbols). However, the prize awarding symbol or symbols may be selected independently of the other symbols, in other embodiments. In this respect, it is envisaged that a separate prize awarding symbol selector may be implemented by the processor 62 to select any prize awarding symbol or symbols independently from the symbol selector 310.

In this embodiment, the symbols selected by the symbol selector 310 are for display on a bottom display 54A of the display 54 at respective symbol display positions of the spinning reels of a spinning reel game. In this embodiment, the bottom display 54A may be a portion of the display 54 that is specifically reserved for displaying the selected symbols. However, it is envisaged that the selected symbols may not be displayed in a portion of a display that is allocated for displaying the selected symbols in an alternative embodiment. That is, in an alternative embodiment, the selected symbols may be displayed in a portion of the display 54 that is specifically reserved for displaying the selected symbols.

At indicated above, the symbols selected by the symbol selector 310 may include one or more prize awarding symbols. In this embodiment, each prize awarding symbol is in the form of a golden "special" coin that can be animated during a prize awarding animation. However, it will be appreciated that a prize awarding symbol may not be in the form of a golden "special" coin or be animated in an alternative embodiment.

The modules implemented by the processor 62 include a display controller 323 comprising a prize awarding symbol determiner 320. The prize awarding symbol determiner 320 determines whether or not there are any prize awarding symbol or symbols (that is, the above mentioned golden "special" coin or coins) in the symbols selected by the symbol selector 310. If the prize awarding symbol determiner 320 determines that there is at least one prize awarding symbol, display controller 323 that controls the video display 54 to display a prize awarding animation during which the selected symbols (which includes the one or more prize awarding symbols or coins) are displayed. In this embodiment, the prize awarding symbol determiner 320 is part of the display controller 323. However, it is envisaged that the prize awarding symbol determiner may be a separate module from the display controller 323 implemented by the processor 62 in an alternative embodiment.

Depending on the embodiment, the prize awarding symbol determiner 320 may control the entire display 54 or just a portion of the display 54 to display the prize awarding animation. Also, it is envisaged that, a prize awarding animation may not be displayed in some embodiments irrespective of whether or not there are any prize awarding symbol or symbols selected by the symbol selector 310. That is, it is envisaged that a prize awarding animation may not be displayed even if the symbol selector 310 has selected one or more prize awarding symbols in an embodiment.

In this embodiment, a prize awarding animation is displayed and the prize awarding animation involves an animation object or character in the form of a leprechaun throwing prize awarding symbols (that is, the "special" coins) from a top display 54B of the display 54 to the spinning reels of the spinning reel game that are displayed on a bottom display 54A of the video display 54. During the prize awarding animation, reels are shown as spinning on the bottom display 54A.

While the reels spin in bottom display 54A, the prize awarding symbols or coins are animated and move from the top display 54B to the bottom display 54A. Once the coins have moved to the bottom display 54A at respective symbol display positions on the spinning reels, the reels stop spinning. In this embodiment, the reels of the spinning reel game spin while the prize awarding animation is displayed.

In an alternative embodiment, the prize awarding animation may not be displayed while the reels are spinning. For example, the prize awarding animation may be displayed only after the reels have stopped spinning in another embodiment. Also, there may not even be a prize awarding animation at all in another embodiment. In such an embodiment, prize awarding symbols (such as the "special" coins mentioned above) may alternatively be displayed on the reels immediately after the reels have stopped spinning, or even immediately after being selected (either together with or independently of the other non-prize awarding symbols) by the symbol selector 310.

The modules implemented by the processor 62 also include an input device monitor 330 which monitors that the game play mechanism 56 to determine whether or not a player of the gaming machine 100 has pressed a "play" button provided by the game play mechanism 56 after the display controller 323 controls the video display 54 to display the prize awarding animation. If the input device monitor 330 determines that the "play" button has been pressed, the input device monitor 330 determines that a designated condition is met. In an embodiment, the input device monitor 330 may determine that the designated condition is met only if the "play" button is pressed after the prize awarding animation is displayed, or only if the "play" button is pressed while the prize awarding animation is displayed. In other embodiments, the input device monitor 330 may determine that a designated condition is met in an alternative way, for example, when a player activates an alternative form of the "play" button".

When the input device monitor 330 determines that the designated condition is met, a prize awarding symbol modifier 380 implemented by the processor 62 modifies the prize awarding symbols to reveal symbols corresponding to one or more awards from an award set stored in the memory 64. In this embodiment, an award may be a wild symbol, a prize (such as a credit prize or a bonus prize), or a jackpot (for example, a mini jackpot, a minor jackpot, a major jackpot or a grand jackpot). In some embodiments, a defined number of symbols corresponding to a specific award, such as a jackpot prize, may need to be revealed before an award is made. For example, 2, 3 or 4 of the same symbol.

The display controller 323 implemented by the processor 62 also includes an award determiner 390 that determines whether at least one of the one or more awards is a special award such as a prize or jackpot (for example, a bonus prize, a mini jackpot, a minor jackpot, a major jackpot or a grand jackpot), upon the prize awarding symbol modifier 380 modifying the prize awarding symbols to reveal the one or more awards.

If the award determiner 390 that determines that at least one of the awards is a prize or jackpot, the input device monitor 330 monitors the game play mechanism 56 again to determine whether or not the player of the gaming machine 100 has pressed the "play" button again, that is, determine whether the designated condition is met again. If the input device monitor 330 determines that the designated condition is met again, the prize awarding symbol modifier 380 modifies the one or more awards to reveal at least another modified award.

As will be described in further detail in respect to a flowchart shown in FIG. 7, the prize awarding symbol modifier 380 is arranged to repeatedly modify one, some or all of the awards to reveal one or more awards (each of which can be the same or different from the award from which the award is modified), until the award determiner 390 determines that no modified award is a special award.

A prize awarder 350 implemented by the processor 62 evaluates the symbols as modified by the one or more awards, in order to award a prize for each winning combination of the symbols as modified by the one or more awards. As indicated above, this embodiment includes an award determiner 390 for determining whether at least one of the awards is a prize or jackpot upon the prize awarding symbol modifier 380 modifying the prize awarding symbols. It is envisaged that an alternative embodiment of the electronic gaming system 1 may not include such an award determiner 390 and that the prize awarder 350 may evaluate the symbols as modified by the one or more awards revealed by the prize awarding symbol modifier 380 without re-modifying the revealed awards.

Figure 7:
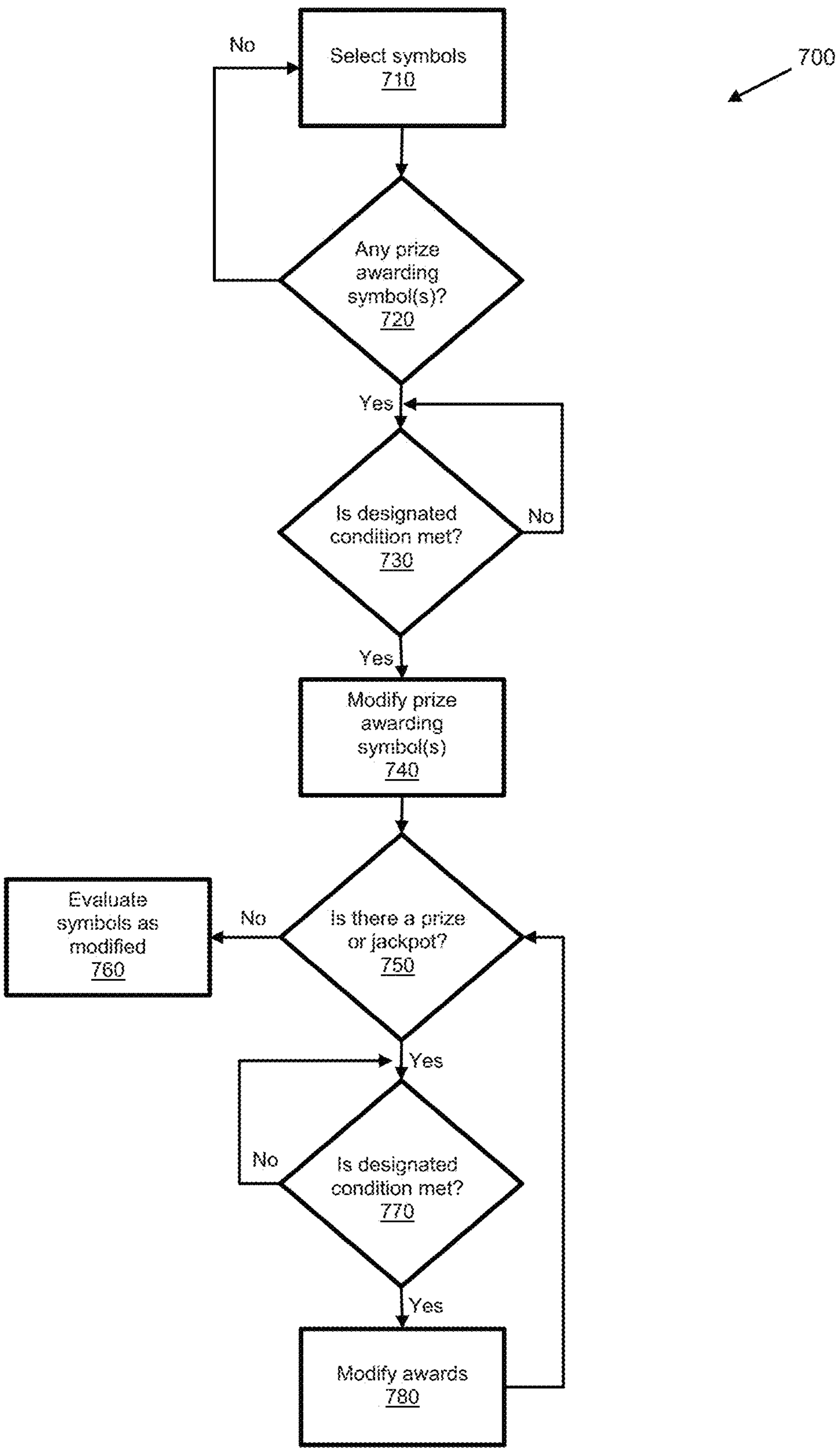
FIG. 7 is a flow chart of an embodiment.

FIG. 7 summarizes in a flowchart an embodiment of an electronic method 700 of gaming on the electronic gaming system 1. When the game starts at step 710, the symbol selector 310 selects from the symbol set 643 symbols for display on the bottom display 54A. As indicated above, the symbols are selected for display at respective ones of a plurality of symbol display positions of a plurality of spinning reels of a spinning reel game in this embodiment.

At step 720, the display controller 323 determines whether or not to control the bottom display 54A and the top display 54B to display a prize awarding animation during which one or more prize awarding symbols move from the top portion of the top display 54B to the bottom portion of the bottom display 54A. In this embodiment, the display controller 323 determines whether or not to control the video display 54 to display a prize awarding animation based on a determination by the prize awarding symbol determiner 320 of whether or not there are any prize awarding symbol or symbols selected by the symbol selector 310. As indicated above, a prize awarding animation may or may not be displayed irrespective of whether or not there are any prize awarding symbols selected by the symbol selector 310, in an alternative the embodiment. That is, a prize awarding animation may not be displayed in an embodiment even if the symbol selector 310 has selected one or more prize awarding symbols at step 710.

If the prize awarding symbol determiner 320 determines that there are one or more prize awarding symbols, the input device monitor 330 monitors an input device to determine whether or not a designated condition is met at step 730. In this embodiment, the input device monitor 330 does this by monitoring the game play mechanism 56 to determine whether or not the "play" button provided by the game play mechanism 56 has been activated. As indicated above, it is envisaged that the input device monitor 330 may monitor an input device to determine whether or not a designated condition is met during or before, or both during and before, instead of or in addition to after the one or more prize awarding symbols are displayed in alternative embodiments.

At step 740, the prize awarding symbol modifier 380 modifies the prize awarding symbols to reveal at least one award such as a wild symbol, a credit prize, a bonus prize, a mini jackpot, a minor jackpot, a major jackpot or a grand jackpot, after the input device monitor 330 determines that a designated condition is met. In this embodiment, each prize awarding symbol is a "special" coin. Upon the input device monitor 330 determining that the "play" button provided by the game play mechanism 56 has been pressed, each coin is modified by the prize awarding symbol modifier 380 by flipping the coin in order to reveal the one or more awards.

After revealing the one or more awards, the award determiner 390 determines whether at least one of the awards is a special award (such as a credit or bonus prize, a mini jackpot, a minor jackpot, a major jackpot or a grand jackpot) at step 750. As indicated above, an alternative embodiment of the electronic gaming system 1 may not include an award determiner 390 and the game may end immediately after a prize or prizes are awarded based on the symbols displayed on the bottom display 54A as modified by the one or more awards without any determination of whether or not at least one of the awards is a special award.

If the award determiner 390 determines that none of the awards is a special award, the prize awarder 350 evaluates the symbols as modified by the one or more awards, in order to award a prize for each winning combination at step 760. In this embodiment, the other award other than a special award is a wild symbol, and accordingly an award must be a wild symbol if it is not a special award. Thus, at step 760, the prize awarder 350 evaluates the symbols displayed on the reels as modified by the wild symbols, in order to award a prize or prizes for each or any winning combination.

Otherwise, if the award determiner 390 determines that at least one of the awards is a prize or a jackpot, the input device monitor 330 again monitors the input device to determine whether or not another designated condition is met at step 770. That is, the input device monitor 330 monitors the game play mechanism 56 to determine whether the "play" button provided by the game play mechanism 56 has been pressed again.

Upon the input device monitor 330 determining that another designated condition is met, the prize awarding symbol modifier 380 modifies the awards to reveal another one or more awards at step 780. In an embodiment, upon the input device monitor 330 determining that the "play" button provided by the game play mechanism 56 has been pressed again, the prize awarding symbol modifier 380 again modifies the awards by flipping each award to reveal another one or more modified (or re-modified) awards.

This process repeats until the award determiner 390 determines that no modified award is a special award (that is, a credit or bonus prize, a mini jackpot, a minor jackpot, a major jackpot or a grand jackpot). That is, upon the award determiner 390 determining that at least one modified award is a special award at step 750, the prize awarding symbol modifier repeatedly modifies one, some of all of the modified award into another one or more modified award at step 780 upon the input device monitor 330 determining that another designated condition is met at step 770, until the award determiner 390 determines that no modified award is a special award at step 750.

When the award determiner 390 determines that none of the modified awards is a special award at step 760, the prize awarder 350 evaluates the symbols as modified, in order to award at least one other prize for each winning combination based on the symbols as modified by the modified award or awards at step 760. That is, the prize awarder 350 evaluates the symbols on the spinning reels as modified by the one or more modified awards (which in this embodiment will be all wild symbols), in order to award at least one prize for each winning combination based on the symbols as modified.

In this embodiment, a prize or prizes are awarded based on only the symbols on the spinning reels as modified by the most recently modified award or awards. However, it is envisaged that, in other embodiments, a prize or prizes may be awarded for any winning combination or combinations from the symbols on the spinning reels as modified by the initial set of awards (that is, the initial awards that the coins are modified into) up till any winning combination or combinations from the symbols on the spinning reels as subsequently modified by each subsequently modified set of awards.

As indicated above, it is envisaged that one or more of the above modules may be implemented in a different manner in alternative embodiments. For example, in an alternative embodiment, it is envisaged that the input device monitor 330 may monitor input device such as game play mechanism 56 of the electronic gaming system 1 to determine that a designated condition is met before the prize awarding symbol determiner 320 determines whether or not there is at least one prize awarding symbol in the symbols selected by the symbol selector 310.

EXAMPLE

Figure 8A:
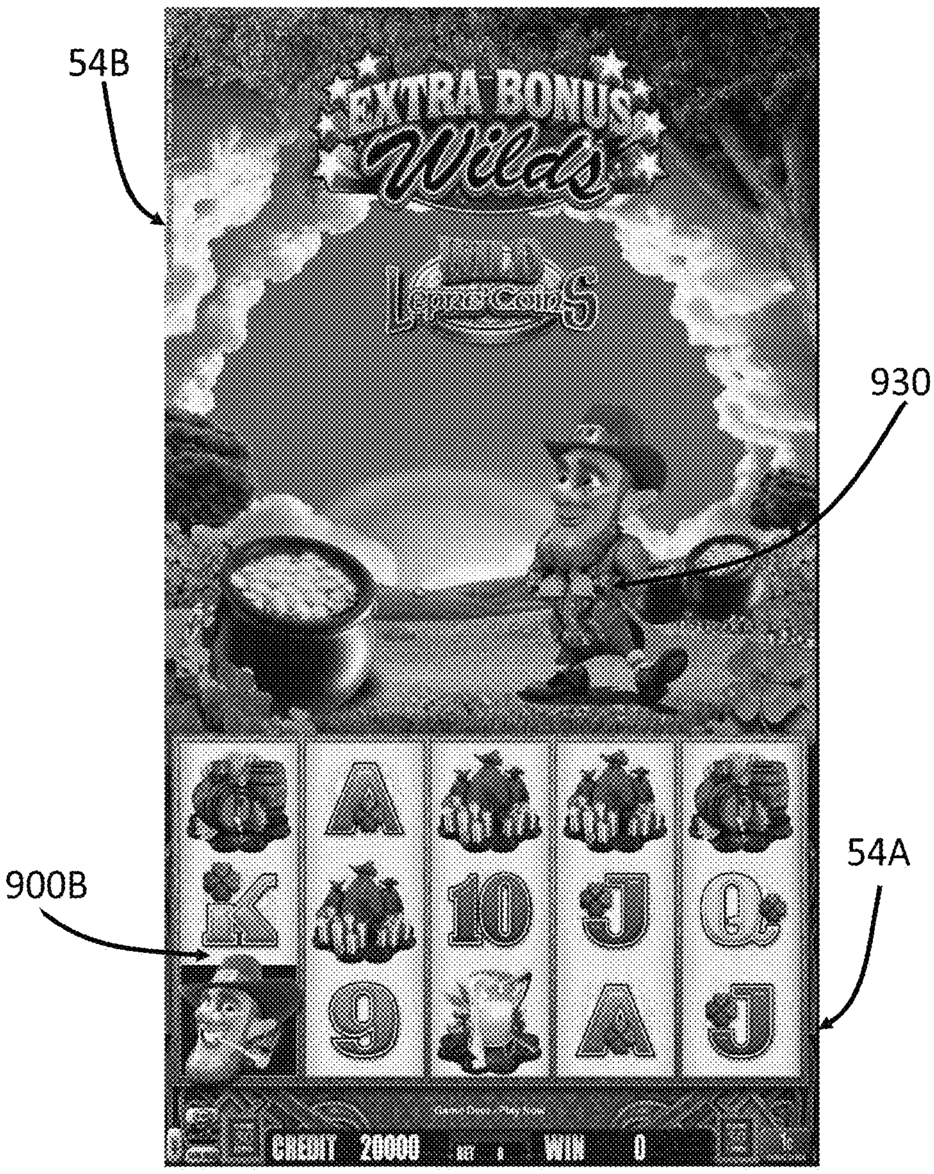
FIGS. 8A and 8B are screen shots of a game in accordance with an example.
Figure 8B:
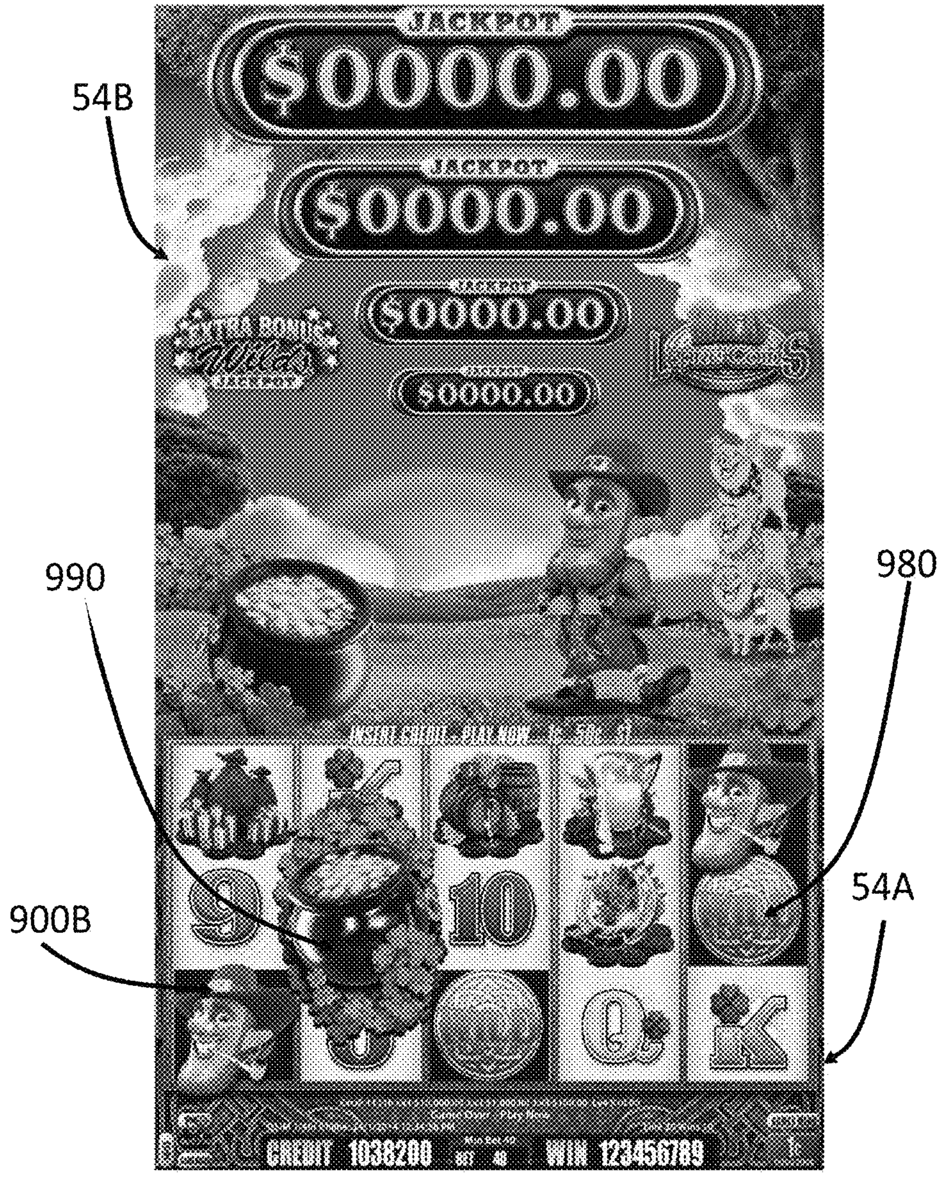

Referring to FIGS. 8A and 8B, there is shown an example of a feature game provided by an embodiment of the electronic gaming system 1 in the form of a gaming machine.

As shown in the figures, a bottom display 54A ("bottom screen") in the form of a bottom portion of the display 54 of the electronic gaming system 1 is positioned immediately below a second video display is 54B ("top screen") in the form of a top portion of the display 54. As indicated above, in an alternative embodiment of the electronic gaming system 1, the electronic gaming system 1 may have two separate displays (that is, two displays that are physically separated) for each of the bottom screen and the top screen.

In FIG. 8A, a symbol display 900A comprising fifteen symbols of a spinning reel game, is shown in the bottom display 54A. An animated object in the form of a leprechaun 930 with a pot of gold is shown in the top display 54B.

During the prize awarding animation, the reels displayed on the bottom display 54A spin while the leprechaun displayed on the top display 54B reaches into the pot and throws one or more handfuls of prize awarding symbols in the form of golden "special" coins from the pot to the bottom display 54A.

In this embodiment, the symbols on the reels change during the prize awarding animation due to the movement of the reels by virtue of their spinning under control of the game controller.

As shown in FIG. 8B, each of the coins may be modified to reveal a wild symbol 980 to form a modified symbol display 900B. Alternatively, one or more coins may be modified to reveal a prize or jackpot 990.

In this respect, it is also noted that objects other than the leprechaun and coins displayed on either one or both of the top display 54B and the bottom display 54A may change or animate before, during or after the prize awarding animation. For example, a jackpot object showing the size of each jackpot (such as a mini, major or grand jackpot) may be displayed if there is at least one jackpot after the coins are modified to reveal the awards during the prize awarding animation, as illustrated in FIG. 8B.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

For example, in some embodiments, an eligibility criterion may be applied for the player to be eligible for a game, for example that the player has made a certain sized wager, made an ante bet, selected all win lines, played sufficient games, or the player is a member of a loyalty program.

In the above embodiment, a series of free games or free spins is awarded. In some embodiments, there may be other types of game rounds awarded such as re-spins where some reels are held while other reels are re-spun. A game round involves at least one of the reels being "spun"—e.g. new symbols of the reels are selected for display at the display positions and the reel is either physically or virtually spun to a stop. Persons skilled in the art will appreciate that there may be more than one game round in a play of a gaming machine such as is the case when a series of free spins is awarded. The outcome of a game round may be no win, a win (for example from a winning combination of symbols), a contribution towards a win accrued over a plurality of game rounds, a trigger condition occurring etc. Typically, a win will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A non-transitory computer-readable medium comprising data indicative of a set of symbols and program codes, for conducting a game on a gaming system having a server coupled to a network of devices each having a display and an input device, the server having a controller that includes one or more processors, and the program codes, which, when executed, cause the one or more processors to perform the steps of:

transmitting data indicative of a plurality of symbols randomly selected from the set of symbols based on one or more random numbers generated by a random number generator for display at a first device of the network of devices;

controlling a first portion of the display of the first device to animate the plurality of symbols being selected;

controlling a second portion of the display of the first device to animate a prize symbol being visually moved toward one or more of the plurality of symbols displayed at the first portion;

transmitting data indicative of a first award at the one or more of the plurality of symbols selected when a first input is detected at the input device of the first device;

in response to a second input having been detected at the input device and the first award transmitted including a special award, transmitting data indicative of a second award via the special award; and controlling the display to animate a winning combination evaluated from the plurality of symbols displayed.

2. The non-transitory computer-readable medium of claim 1, wherein the program codes, when executed, further cause the one or more processors to perform the step of causing the special award to communicate the second award until a designated condition is met when the second input is determined at the input device, and one of the first award revealed and the second award revealed includes the special award.

3. The non-transitory computer-readable medium of claim 2, wherein the designated condition comprises the second award not including the special award.

4. The non-transitory computer-readable medium of claim 1, wherein the program codes, when executed, further cause the one or more processors to perform the step of causing the prize symbol moving toward the one or more of the plurality of symbols while animating on the display the plurality of symbols being randomly selected from the set of symbols.

5. The non-transitory computer-readable medium of claim 1, wherein the program codes, when executed, further cause the one or more processors to perform the step of communicating the first award when the first input is determined at the input device and the prize symbol reaches the one or more of the plurality of symbols.

6. The non-transitory computer-readable medium of claim 1, wherein the input device includes a button, wherein the program codes, when executed, further cause the one or more processors to perform the step of determining whether the button has been activated for at least one of the first input and the second input.

7. The non-transitory computer-readable medium of claim 1, wherein the program codes, when executed, further cause the one or more processors to perform the step of, when communicating the first award, further determining if the one or more of the plurality of symbols include the special award.

8. A method of presenting an award in a gaming system having a server coupled to a network of devices each having a display and an input device, the server having a controller that includes a processor and a memory storing data indicative of a set of symbols and program codes, which, when executed, cause the processor to at least initiate a game on a first device of the network of devices, the method comprising:

transmitting, from the server to the first device, data indicative of a plurality of symbols randomly selected from the set of symbols based on one or more random numbers generated by a random number generator for display at the first device;

controlling the display at the first device to animate a prize symbol being visually moved toward one or more of the plurality of symbols selected on the display at the first device;

controlling the display at the first device to animate on the display the one or more of the plurality of symbols selected being visually modified to communicate a first award when data indicative of a first input is received at the input device of the first device;

controlling the display at the first device to animate a special award being modified to reveal a second award when data indicative of a second input is received at the input device of the first device and the first award includes the special award; and controlling the display to animate a winning combination evaluated from the plurality of symbols displayed.

9. The method of claim 8, further comprising repeatedly animating on the display the special award being modified to reveal the second award until a designated condition is met in response to the second input is determined at the input device, and one of the first award revealed and the second award revealed includes the special award.

10. The method of claim 9, wherein the designated condition comprises the second award not including the special award.

11. The method of claim 8, further comprising animating on the display the prize symbol moving toward the one or more of the plurality of symbols while animating on the display the plurality of symbols being randomly selected from the set of symbols.

12. The method of claim 8, wherein the special award includes at least one of a credit prize, a bonus prize, a mini jackpot, a minor jackpot, a major jackpot, and a grand jackpot.

13. The method of claim 8, wherein the input device includes a button, further comprising determining whether the button has been activated for at least one of the first input and the second input.

14. The method of claim 8, wherein the prize symbol is one or more coins, and wherein the prize symbol being visually moved includes controlling the display at the first device to animate the one or more coins being visually flipped.

15. A non-transitory computer-readable medium comprising data indicative of a set of symbols and program codes for conducting a game on a gaming system having a server coupled to a network of devices each having a display device and an input device, the server having a controller that includes one or more processors, and the program codes, which, when executed, cause the one or more processors to perform the steps of:

controlling the display device, with data transmitted from the server, to animate a plurality of symbols being randomly selected, based on one or more random numbers generated by a random number generator, from the set of symbols for display at a first portion of the display device;

controlling the display device to animate one or more prize awarding symbols being visually moved from the first portion toward one or more of the plurality of symbols being selected for display in a second portion of the display device;

monitoring for data indicative of a first input being received at the input device;

controlling the display device to animate the one or more of the plurality of symbols selected being visually flipped to reveal a first award in response to data indicative of the first input having been received at the input device;

monitoring for data indicative of a series of second inputs being received at the input device;

in response to data indicative of each in the series of second inputs having been received at the input device and the first award revealed to include a special award, controlling the display device to animate the special award being flipped to repeatedly reveal one in a series of second awards; and controlling the display to animate a winning combination evaluated from the plurality of symbols displayed including any symbols that have been flipped.

16. The non-transitory computer-readable medium of claim 15, further comprising repeatedly animating on the display device the special award being flipped to reveal the one in the series of second awards until a designated condition is met in response to the series of second inputs is determined at the input device and one of the first award revealed and the one in the series of second awards revealed includes the special award.

17. The non-transitory computer-readable medium of claim 16, wherein the designated condition comprises the one in the series of second awards not including the special award.

18. The non-transitory computer-readable medium of claim 15, further comprising displaying on the display device a prize awarding animation involving one or more prize awarding symbols moving toward the one or more of the plurality of symbols while animating on the display device the plurality of symbols being randomly selected from the set of symbols.

19. The non-transitory computer-readable medium of claim 18, further comprising controlling the display device to reveal the first award in response to the first input is determined at the input device when the one or more prize awarding symbols reaches the one or more of the plurality of symbols.

20. The non-transitory computer-readable medium of claim 18, wherein the one or more prize awarding symbols are one or more coins, and wherein controlling the display device to animate the one or more prize awarding symbols being visually moved includes controlling the display device to animate the one or more coins being visually flipped.

* * * * *